US007913235B2

(12) United States Patent
Rose et al.

(10) Patent No.: US 7,913,235 B2
(45) Date of Patent: Mar. 22, 2011

(54) ON-DEMAND CREATION OF POSIX LOCALE SOURCE

(75) Inventors: Daniel Alan Rose, Markham (CA); Baldev Singh Soor, Markham (CA)

(73) Assignee: International Business Machines Corporation, Armonk, NY (US)

(*) Notice: Subject to any disclaimer, the term of this patent is extended or adjusted under 35 U.S.C. 154(b) by 990 days.

(21) Appl. No.: 11/014,157

(22) Filed: Dec. 16, 2004

(65) Prior Publication Data

US 2005/0138146 A1   Jun. 23, 2005

(30) Foreign Application Priority Data

Dec. 23, 2003 (CA) .................................. 2453973

(51) Int. Cl.
G06F 9/45 (2006.01)
G06F 9/44 (2006.01)
G10L 21/00 (2006.01)
G06Q 40/00 (2006.01)

(52) U.S. Cl. ........... 717/137; 717/106; 704/277; 705/35

(58) Field of Classification Search .................. None
See application file for complete search history.

(56) References Cited

U.S. PATENT DOCUMENTS

| | | | | |
|---|---|---|---|---|
| 4,962,452 | A * | 10/1990 | Nogami et al. | |
| 5,440,482 | A * | 8/1995 | Davis | |
| 5,579,224 | A * | 11/1996 | Hirakawa et al. | |
| 5,724,593 | A * | 3/1998 | Hargrave, III et al. | |
| 5,835,768 | A * | 11/1998 | Miller et al. | 719/320 |
| 6,025,836 | A * | 2/2000 | McBride | 715/750 |
| 6,047,283 | A * | 4/2000 | Braun | |
| 6,492,995 | B1 * | 12/2002 | Atkin et al. | 715/703 |
| 6,944,846 | B2 * | 9/2005 | Ryzhov | 717/116 |
| 7,024,365 | B1 * | 4/2006 | Koff et al. | 704/270.1 |
| 2002/0107684 | A1 * | 8/2002 | Gao | 704/4 |
| 2002/0116408 | A1 * | 8/2002 | Green et al. | 707/205 |
| 2003/0084401 | A1 * | 5/2003 | Abel et al. | 715/501.1 |
| 2005/0137846 | A1 * | 6/2005 | Rose et al. | 704/2 |

OTHER PUBLICATIONS

International Business Machines Corporation, IBM Application System/400 ILE C/400, Version 3, Release 7, Modification Level 0, p. 1, p. 188, & p. 489.*
Yong, et al.; "Java Input Method Engine", Computer Networks and ISDN Systems, vol. 30, No. 1-7, pp. 271-279.*
Liu, et al.; "Distributed multilingual applications of the OSI architecture", Computer Standards and Interfaces, vol. 19, No. 1 pp. 9-29, Jan. 1998.*

* cited by examiner

*Primary Examiner* — Michael J Yigdall
*Assistant Examiner* — Evral Bodden
(74) *Attorney, Agent, or Firm* — Toler Law Group

(57) ABSTRACT

A method for creating a specific POSIX style locale source file, on demand, suitable for compilation in a computer is provided the method comprising, receiving a request submitted for the specific POSIX style locale, and obtaining a plurality of localization values related to the specific POSIX style locale. Next, determining a category within the plurality of localization values and selecting process routines dependent upon the category, and then selectively extracting the category information. After extracting the category information is stored into a memory of the computer. A determination is made regarding more categories to process, which might result in processing the remaining categories, otherwise assembling the extracted information into the POSIX style locale source file. Assembling may entail addition of no files or files such as LC-CTYPE and LC_COLLATE to form a locale source suitable for compilation.

16 Claims, 4 Drawing Sheets

ON-DEMAND CREATION OF POSIX LOCALE SOURCE

FIELD OF THE INVENTION

This present invention relates generally to localization values in a computer resource file, and more particularly to creating a POSIX style locale source file from a plurality of localization values in a computer resource file.

BACKGROUND OF THE INVENTION

In the computer software marketing and distribution industry, it is advantageous to make computer software available for use that reflects the language and culture of the intended users. A locale source file is a computer resource file typically made available by a developer of a software application to assist in accomplishing this. A locale source file may include a combination of specifications required to configure a software application program for a particular geographic and cultural market. These specifications typically include a language specification to determine and control linguistic manipulation of character strings within the application program. In addition specifications for countries, regions and territories (collectively referred to herein as "country") define cultural conventions that may vary with languages, cultures or across countries. An example of a cultural convention is a date format identifying in which order the numerals representing day, month and year appear. Other configuration preferences, such as those used to specify mail settings or favorite icons are known in the art, but are typically not included in locale source files but may be included in other forms of personalization support.

Locale source files are usually processed into a form that can be readily used by an application program. Compilation of a source form of a locale file is one typical means of producing an object that can be accessed by an application program needing the information provided by the locale file.

Ensuring computer application program processing of information according to local cultural and geographical preferences relies on the availability of a locale object for a given combination of language and country. In order to make a locale object available there is a need to have a number of ready-made locale objects or locale source files ready to be compiled. Creating locale source files is typically tedious work requiring significant time and effort on the part of skilled programmers. Compiling objects in anticipation of use also takes time and effort as well as consuming computing resources. Locale objects that have been created but not used or are used infrequently waste computing resources and programmer time. Further locale objects themselves cannot be created until the necessary locale source files on which they are based have been built.

It is therefore desirable to have an easier more efficient manner of producing locale source files for use in a computer.

SUMMARY OF THE INVENTION

Embodiments of the present invention are provided for creating locale source files as they are required from a plurality of localization values in a computer resource file.

An embodiment of the present invention may be employed to generate specific locale source files by request or on demand. Results provided by embodiments of the invention typically afford easier more efficient means of making selected locale source files available on a computer as required.

In accordance with an aspect of the present invention, there is provided a method for creating a specific POSIX style locale source file on demand suitable for compilation in a computer, said method comprising, receiving a request submitted for said specific POSIX style locale, obtaining a plurality of localization values related to said specific POSIX style locale, determining a category of localization values within said plurality of localization values and selecting process routines dependent upon said category, selectively extracting said localization values pertaining to said category by said selected process routines, storing said extracted localization values into a memory of said computer, and assembling said extracted information into said POSIX style locale source file suitable for compilation.

According to another aspect of the present invention, there is provided a system for creating a specific POSIX style locale source file on demand suitable for compilation in a computer, said system comprising, a receiver adapted to receive a request submitted for said specific POSIX style locale, a means for obtaining a plurality of localization values related to said specific POSIX style locale, a means for determining a category of localization values within said plurality of localization values and selecting process routines dependent upon said category, an extractor for selectively extracting said localization values pertaining to said category by said selected process routines, a storage means for storing said extracted localization values into a memory of said computer, and an assembling means for assembling said extracted information into said POSIX style locale source file suitable for compilation.

According to yet another aspect of the present invention, there is provided a computer program product having a computer readable medium tangibly embodying computer readable program code for instructing a computer to perform a method for creating a specific POSIX style locale source file on demand suitable for compilation in a computer, said method comprising, receiving a request submitted for said specific POSIX style locale, obtaining a plurality of localization values related to said specific POSIX style locale, determining a category of localization values within said plurality of localization values and selecting process routines dependent upon said category, selectively extracting said localization values pertaining to said category by said selected process routines, storing said extracted localization values into a memory of said computer, and assembling said extracted information into said POSIX style locale source file suitable for compilation.

According to yet another aspect of the present invention, there is provided a signal bearing medium having a computer readable signal tangibly embodying computer readable program code for instructing a computer to perform the method for creating a specific POSIX style locale source file on demand suitable for compilation in a computer, said method comprising, receiving a request submitted for said specific POSIX style locale, obtaining a plurality of localization values related to said specific POSIX style locale, determining a category of localization values within said plurality of localization values and selecting process routines dependent upon said category, selectively extracting said localization values pertaining to said category by said selected process routines, storing said extracted localization values into a memory of said computer, and assembling said extracted information into said POSIX style locale source file suitable for compilation.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described, by way of example, with reference to the accompanying drawings, in which.

Figure 1:
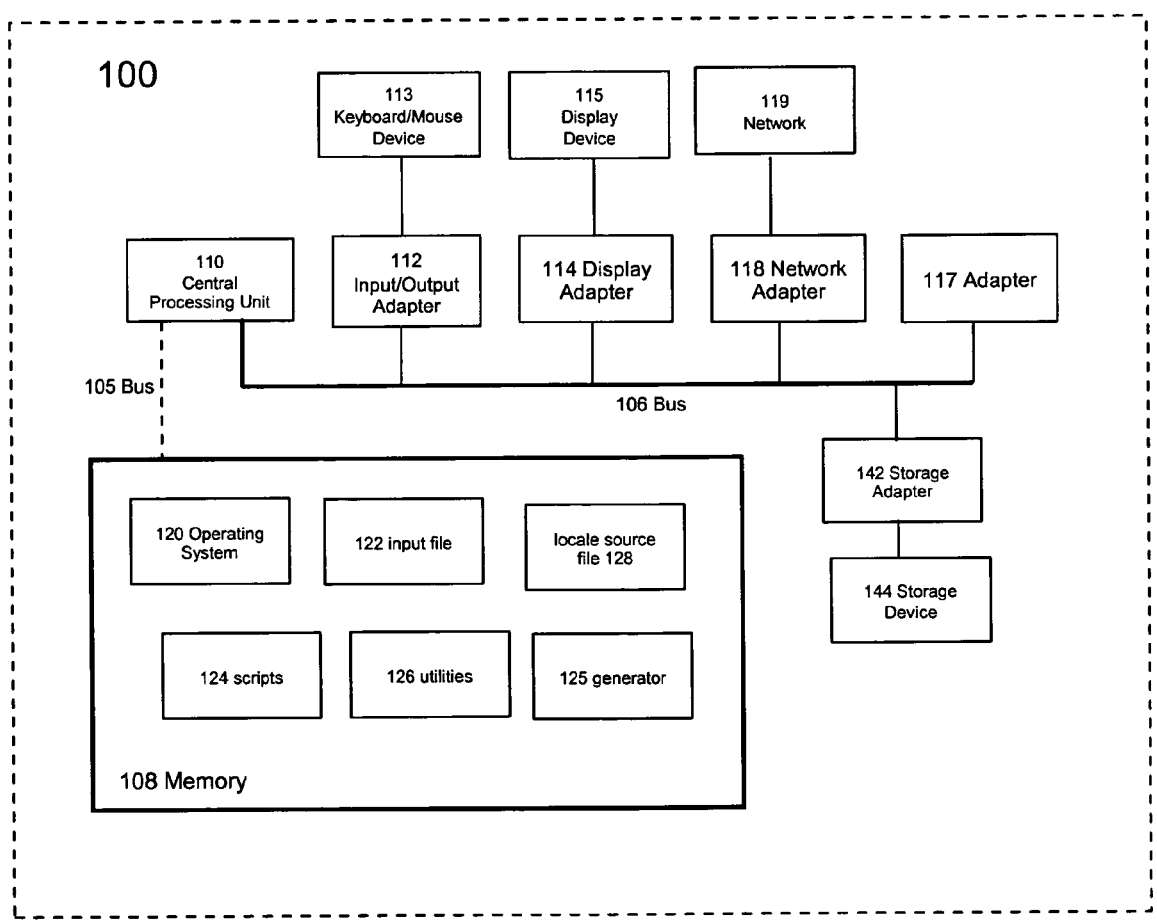
FIG. 1 is a hardware overview of a computer system, exemplary of an embodiment of the present invention.

Like reference numerals refer to corresponding components and steps throughout the drawings. It is to be expressly understood that the description and the drawings are only for the purpose of illustration and as an aid to understanding, and are not intended as a definition of the limits of the invention.

DETAILED DESCRIPTION

FIG. 1 depicts, in a simplified block diagram, a computer system 100 suitable for implementing embodiments of the present invention. Computer system 100 has a central processing unit (CPU) 110, which is a programmable processor for executing programmed instructions, such as instructions contained in utilities (utility programs) 126 stored in memory 108. Memory 108 can also include hard disk, tape or other storage media. While a single CPU is depicted in FIG. 1, it is understood that other forms of computer systems can be used to implement the invention, including multiple CPUs. It is also appreciated that the present invention can be implemented in a distributed computing environment having a plurality of computers communicating via a suitable network 119, such as the Internet.

CPU 110 is connected to memory 108 either through a dedicated system bus 105 and/or a general system bus 106. Memory 108 can be a random access semiconductor memory for storing language and culture data for each country and culture such as input file 122 and scripts 124. Scripts 124 provide routines to process input file 122 creating output locale source file 128. Memory 108 is depicted conceptually as a single monolithic entity but it is well known that memory 108 can be arranged in a hierarchy of caches and other memory devices. FIG. 1 illustrates that operating system 120, input file 122, scripts 124, locale source file 128 and utilities 126, may reside in memory 108.

Operating system 120 provides functions such as device interfaces, memory management, multiple task management, and the like as known in the art. CPU 110 can be suitably programmed to read, load, and execute instructions of operating system 120, scripts 124 and instructions of utilities 126. Computer system 100 has the necessary subsystems and functional components to implement testing of locale files as will be discussed later. Other programs (not shown) include server software applications in which network adapter 118 interacts with the server software application to enable computer system 100 to function as a network server via network 119.

General system bus 106 supports transfer of data, commands, and other information between various subsystems of computer system 100. While shown in simplified form as a single bus, bus 106 can be structured as multiple buses arranged in hierarchical form. Display adapter 114 supports video display device 115, which is a cathode-ray tube display or a display based upon other suitable display technology which may be used to depict test results. The Input/output adapter 112 supports devices suited for input and output, such as keyboard or mouse device 113, and a disk drive unit (not shown). Storage adapter 142 supports one or more data storage devices 144, which could include a magnetic hard disk drive or CD-ROM drive although other types of data storage devices can be used, including removable media for storing input file 122 and the output of scripts 124 being locale source file 128.

Adapter 117 is used for operationally connecting many types of peripheral computing devices to computer system 100 via bus 106, such as printers, bus adapters, and other computers using one or more protocols including Token Ring, LAN connections, as known in the art. Network adapter 118 provides a physical interface to a suitable network 119, such as the Internet. Network adapter 118 includes a modem that can be connected to a telephone line for accessing network 119. Computer system 100 can be connected to another network server via a local area network using an appropriate network protocol and the network server can in turn be connected to the Internet. FIG. 1 is intended as an exemplary representation of computer system 100 by which embodiments of the present invention can be implemented. It is understood that in other computer systems, many variations in system configuration are possible in addition to those mentioned here.

In one embodiment of the invention the process involves traversing the input file of localization information while searching for values that announce the location of categories of interest. When such a category is encountered a selection of an appropriate script resource may be made. The chosen script resource is optimized for the particular category and entries within that category to be processed. For example, in an embodiment of the invention, to process a date and time category, upon locating such a category, one of a plurality of possible script modules may be invoked dependent upon the particular category being processed. A need for specialized script modules will become apparent through later discussion of the process.

Standard utilities (as in utilities 126 of FIG. 1) available on platforms are used in conjunction with the scripts. Standard utilities used include those for substring, case mapping, Unicode conversion, string and character comparison and table lookup operations. Comparisons may involve a user or may be programmatic in nature using a comparator in conjunction with reference data.

An exemplary process of an embodiment of the present invention consists of a series of operations typically as follows: "prepare", "process", "compare" and "generate". Upon receipt of a request for a locale source to be created, a "prepare operation" obtains localization data as input, while a "process" operation invokes appropriate scripts to parse, and analyse the localization data to produce an output in combination with templates, as required by the category being processed, to produce a well formed output. A "compare operation" is used on the parsed data of the prepare operation to compare against selected reference strings as needed. In a "generate" operation, previous output that may have been stored as logical units will be consolidated with the addition of supporting LC_CTYPE and LC_COLLATE data into a locale source file.

The "prepare process" pulls the category elements out of the localization data file syntax and environment and into a simple text form for collection into respective category entries. Output fields are used to store the collection results of the prepare process in a combination of name-value pairs.

Script modules which process the input file use announcement strings of the various categories and elements to indicate what is to be processed. Obtaining a match confirms the category to be processed and allows the main routine to selectively and more correctly process the associated values.

The result of processing is a hierarchical collection of values. The highest level is the root or locale identifier for the whole collection. The next level is the various category identifiers and finally the associated substrings and related values.

Figure 2:
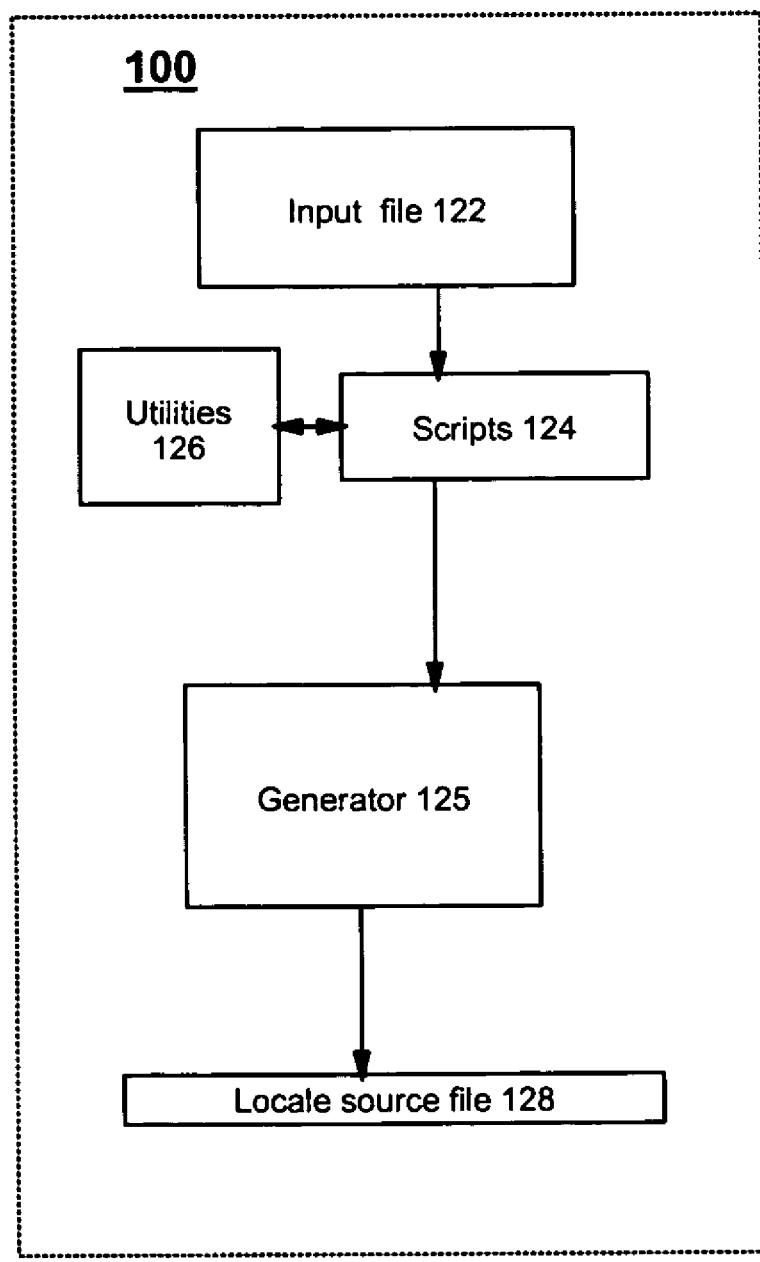
FIG. 2 is a block diagram of a high level view of components of an embodiment of the present invention.

Referring to FIG. 2 is a block diagram depicting an overview of the components in an embodiment of the invention performed on an exemplary system of FIG. 1. Input file 122 is processed by scripts 124 in conjunction with utilities 126 to produce data output. This data output is passed through generator 125 to produce output of locale source file 128. Scripts 124, utilities 126 and generator 125 may be provided by hardware, software or a combination of both means.

Figure 3:
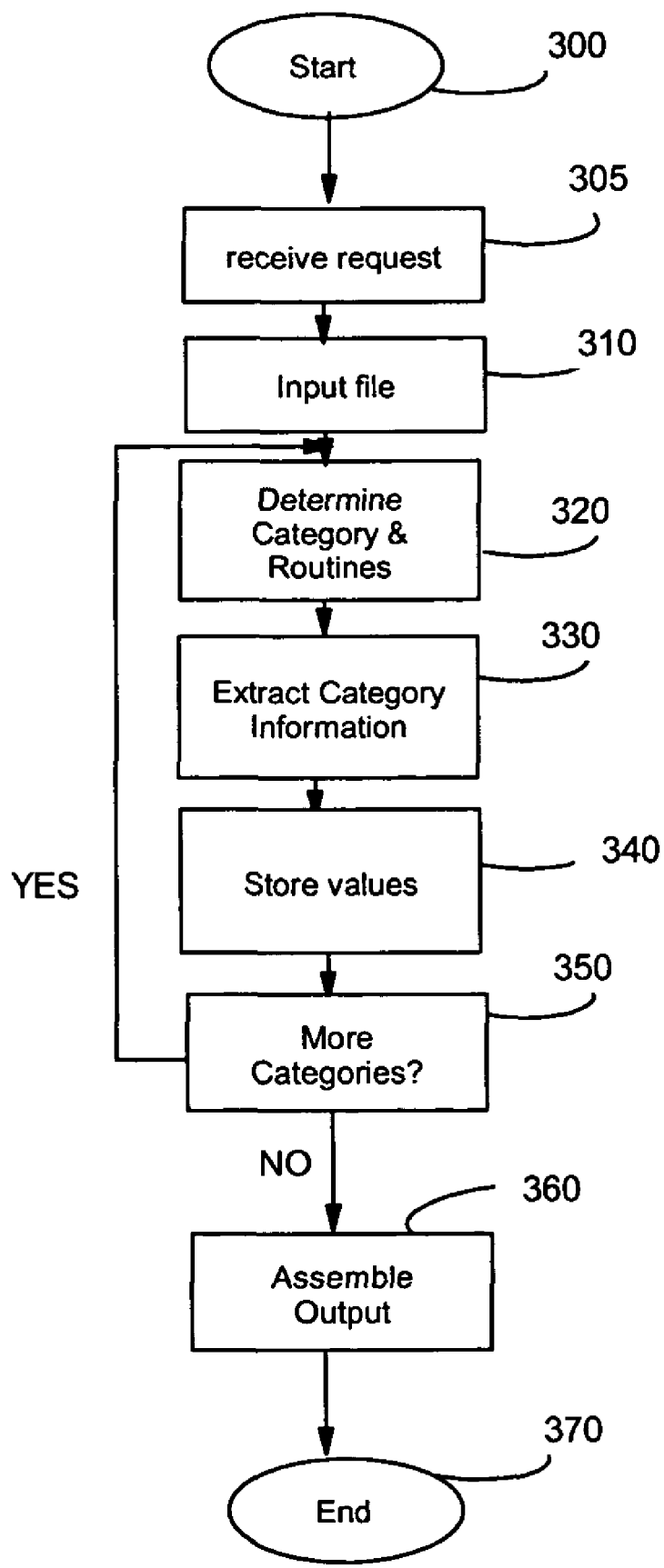
FIG. 3 is flow diagram showing the overview of the process used in conjunction with the components of FIG. 2.

Referring now to FIG. 3 is a flow diagram showing the overall process as performed by the components as shown in FIG. 2. Processing begins in operation 300 where any necessary setup may be performed and moves to operation 305. During operation 305 a request for a specific locale source file to be created is received. Upon receipt of the request, the request is examined for completeness. A well-formed request needs to specify a desired locale. One manner is to provide an "id_ID" to correctly specify the locale. The use of such an identifier is common in the art where "id" represents language and "ID" represents country or territory. Receipt of the request causes the process to move to operation 310 during which is obtained input file 122 of FIG. 1. If there is more than one input file they are merged. For example, an input file may be a logical file consisting of many input files wherein files may be segmented to contain a portion of the required locale information. Once obtained and merged if necessary, a scripting operation 320 is performed to determine the category being processed and which routines to select based on the category determined. Extracting specific values occurs during operation 330, wherein these values are then stored in a memory during operation 340 in a predetermined form for later use. The process is repeated for each category of input file 122 until all elements have been processed. Intermediate results may be stored in any form, as is known in the art, providing suitable retrieval, such as but not limited to, arrays, vectors, tables and lists.

Then during operation 350 a determination is made regarding existence of more categories to process. If during operation 350 it is determined that more categories exist to be processed, operations will move to operation 320 again where processing will occur as before. If there are no more categories to process, as determined during operation 350, processing will move to operation 360. During operation 360 generator 125 of FIGS. 1 and 2 assembles the output from the previous operations. Having then assembled all output which may include adding other files such as those for LC_CTYPE and LC_COLLATE, processing moves to end at operation 370.

Figure 4:
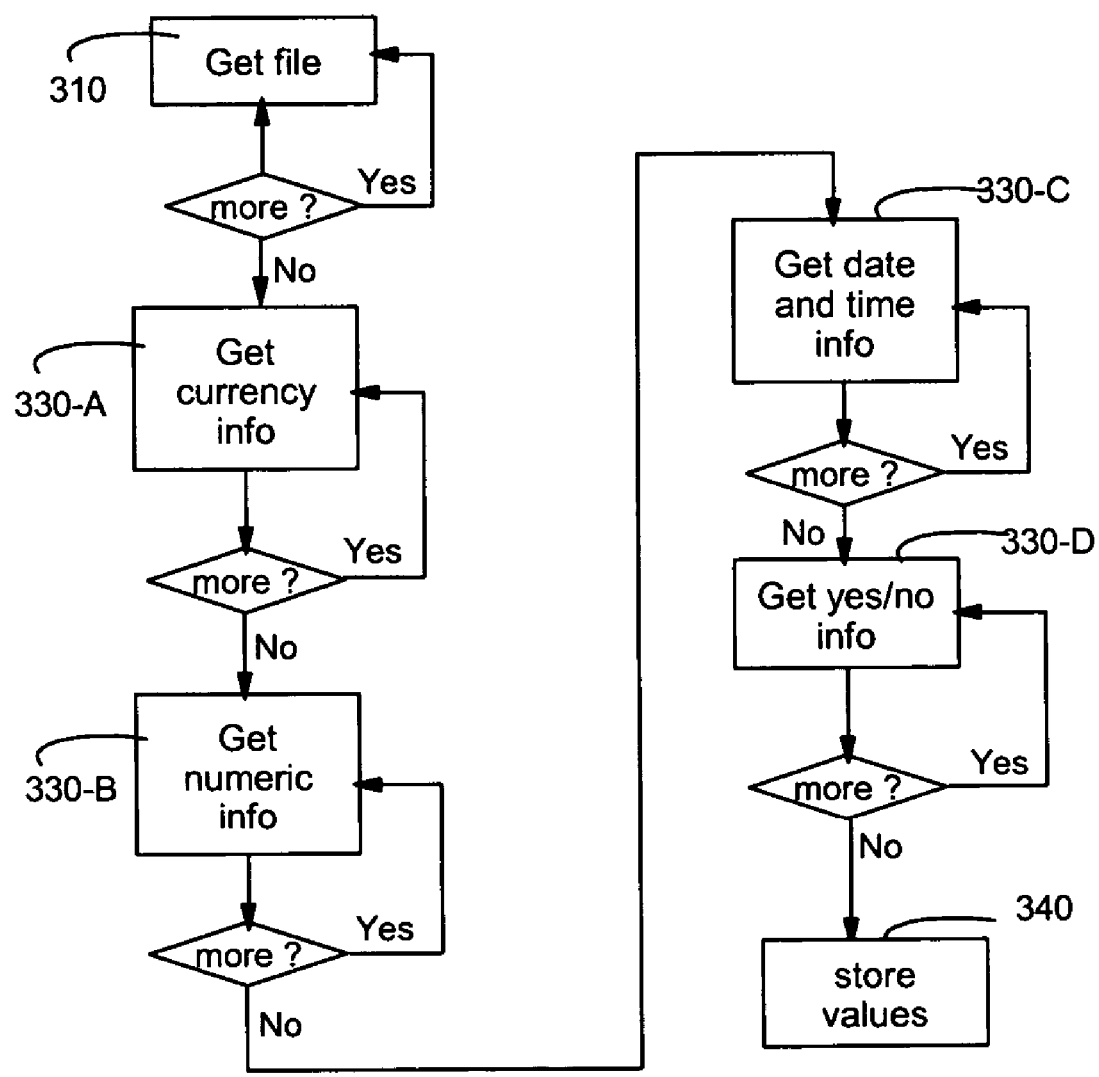
FIG. 4 is a flow diagram detailing operations of elements 330 and 340 of FIG. 3.

Referring to FIG. 4 details of scripting operation 330 will now be described. Scripting operation 330 uses a readily available scripting facility as is known in the art. Scripting is a form of programming which is powerful yet relatively simple. The scripting functions are knowledgeable of the predefined syntax of input file 122 and are able to iterate through the file invoking various process modules (other specialized scripts) to perform selective actions dependent upon respective portions. For example, an input portion of locale file 122 is typically announced according to convention using a comment string of the form "LC_name" (without quotation marks) wherein the name is the identifier of the specific category, such as LC_Monetary denoting currency information. Contained within, is the actual localization information of interest as a plurality of elements.

Dependent on the usage context of the value being processed a respective module or scripting function is invoked to process the associated string of data. The string of data may be composed in a series of name-value pair's format. An example of which may be seen later in connection with process details.

Before any locales can be created, a validity check should be performed on the localization data to ensure the information for the country/language pair for which the locale will be created has been verified. In this manner, the integrity of the data in the composed locale is ensured.

The following described order is not required but merely shown as an example. The order of categories does not affect the outcome. It may be easier to understand the process by looking at the outcome and then the process to produce that outcome. The file containing a plurality of localization values can be stored in a number of suitable formats such as arrays, tables or lists. It is important however to have the information required in a form that provides efficient retrieval of requested data. For these examples it is assumed that the localization information has been provided in a single file restricted to that of a single locale. Other cases containing localization data for a plurality of locales requires a filtering step to reduce the data to the specifically requested locale of interest first. Further it is assumed that the use of LC-CTYPE and LC_COLLATE category data is by additional means such as separate files. These two files will be added to the output created by the described process to produce the requested locale source file.

One structure within the locale source file to be created deals with monetary formats and is known as the LC_Monetary category. For example the typical conventional format of the monetary information in a locale source file such as 128 of FIG. 1 is as follows:

```
############
LC_MONETARY
############
################################################################
id_ID example of a positive monetary value: Rp. 1.234.567,89 ##
id_ID example of a negative monetary value: -Rp. 1.234.567,89 ##
################################################################
      int_curr_symbol      "<I><D><R><space>"
      currency_symbol      "<R><p><period>"
      mon_decimal_point    "<comma>"
      mon_thousands_sep    "<period>"
      mon_grouping         3
```

| | |
|---|---|
| positive_sign | "" |
| negative_sign | "<hyphen>" |
| int_frac_digits | 2 |
| frac_digits | 2 |
| p_cs_precedes | 1 |
| p_sep_by_space | 1 |
| n_cs_precedes | 1 |
| n_sep_by_space | 1 |
| p_sign_posn | 1 |
| n_sign_posn | 1 |
| END LC_MONETARY | |

This segment of locale source file 128 typically begins with an LC_Monetary and end with an END LC_Monetary statement. Between these two statements are other statements defining the attributes of the segment in particular detail. Each element within the segment is a name-value pair having a descriptor or label as an aid in understanding the context of use. The name-value pairing also allows for more efficient processing during the creation process of the locale source file 128 from the raw localization information of input file 122 of FIG. 1. For simplicity the name of the output name value pair is also used as a field name in input file 122. Such a linkage is not required but is handy for this example. The addition of the two statements having id_ID is related to self-checking information and processing used in the creation of this specific category. A skilled practitioner may copy similar information directly into the output file as another means for visual checking of the output file.

The relative positioning of elements within a category is used to create a template that is then filled with extracted information during the creation process. The monetary information category typically contains the names in the following paragraphs.

The following process steps as shown in FIG. 4 are illustrative of an embodiment of the present invention. The process steps detail operations within operations 330 and 340 of FIG. 3, particularly operation 330 beginning with operation 310. During operation 310 one or more files is obtained and merged to provide necessary localization values to satisfy the request to create a specific locale source file. Through a series of operations each category of the locale source file is addressed beginning with 330-A for monetary processing, 330-B for numeric processing, 330-C for date and time processing and finally with 330-D for yes/no information. Within each 330-xy operation is a series of smaller sub-operations denoted by 330-xy, where x is one of A-D denoting the category to which it applies and where y is a sequential number indicating the operation relative to others in the category set.

Next is operation 330-A1 during which is obtained the int_curr_symbol information by extracting the ISO 4217 Alphabetic Currency Code from the "Monetary_ISO4217_Alpha_Code" field of the monetary information in the input file. Next is extracted the examples contained in the fields "Monetary_ISO4217_Positive_Format" and "Monetary_ISO4217_Negative_Format". These fields contain examples, in proper format, monetary quantity for both positive and negative formats using ISO 4217 Alphabetic Currency Code. Having obtained the example information parse the extracted strings to determine what currency code is used for both formats and compare the two cases against each other. If they are the same, continue with processing; otherwise, raise a flag and stop. If the examples compare favorably, compare the currency code of the examples with the currency code obtained in first step. If they are the same, continue; otherwise, raise a flag and stop. If the currency codes compared favorably surround each letter of the alphabetic currency code with a pair of angle brackets. Additionally parse either of the positive or negative examples to determine the character separating the alphabetic currency code from the actual monetary quantity and append the separating character to the end of the currency code.

Next during 330-A2 obtain the currency_symbol by extracting the Currency Symbol from the Monetary_NAT_Currency_Symbol" field. Then extract the examples contained in the fields "Monetary_NAT_Positive_Format" and "Monetary_NAT_Negative_Format" for both positive and negative formats. Parse the extracted strings from the examples to determine the currency symbol used and compare that value with the currency symbol obtained in the first operation. If they are the same, continue; otherwise, raise a flag and stop. If the currency symbol is in graphical form, it must be replaced with it's corresponding alphabetic name and finally add quotes to the currency symbol.

Next during operation 330-A3 obtain the mon_decimal_point by extracting the Decimal Separator from the "Monetary_NAT_Decimal_Separator" field. Next extract the examples contained in the fields "Monetary_NAT_Positive_Format" and "Monetary_NAT_Negative_Format" for both positive and negative format. Then parse the extracted strings of the examples to determine the decimal separator for each case and compare them. If they are the same, continue; otherwise, raise a flag and stop. Further, if the decimal separator is in graphical form, it must be replaced with its corresponding alphabetic name. Then compare the decimal separator from the example with the one obtained in the first operation. If they are the same, continue; otherwise, raise a flag and stop. Finally add quotes to the decimal separator.

Next during operation 330-A4 obtain the mon_thousands_sep by extracting the Thousands' Separator from the "Monetary_NAT_Thousands_Separator" field. Then extract the examples contained in the fields "Monetary_NAT_Positive_Format" and "Monetary_NAT_Negative_Format" for both positive and negative formats. Next parse the extracted strings of the examples for both positive and negative format to determine the thousands' separator used in each case. They should be the same for both formats. If they are not, raise a flag and stop. If the thousands separator is in graphical form, is must be replaced with its corresponding alphabetic name. Then compare the thousands separator obtained form the examples with the one obtained in the first operation. If they are the same, continue; otherwise, raise a flag and stop. Finally add quotes to the thousands separator.

Next during operation 330-A5 obtain the mon_grouping, by extracting the value contained in the "Monetary_NAT_Grouping" field. Next extract the examples contained in the fields "Monetary_NAT_Positive_Format" and "Monetary_NAT_Negative_Format" for both positive and negative formats. Then parse the extracted strings of the examples to determine what grouping is used for both formats. They should be the same for both formats. Compare the value from the example format with the one obtained in the first operation. If they are the same, continue; otherwise, raise a flag and stop.

Next during operation 330-A6 obtain the positive_sign extract the value in the "Monetary_NAT_Positive_Sign" field. Next extract the example contained in the "Monetary_NAT_Positive_Format" field for the positive format. Then parse the extracted value in the examples to determine the positive sign and compare it with the positive sign value obtained in the first operation. If they are the same, continue; otherwise, raise a flag and stop.

Next during operation 330-A7 obtain the negative_sign by extracting the value in the "Monetary_NAT_Negative_Sign" field. Next extract the example contained in the "Monetary_NAT_Negative_Format" for the negative format. Then parse the extracted string from the examples to determine the negative sign and compare it with the negative sign value obtained in the first operation. If they are the same, continue; otherwise, raise a flag and stop.

Next during operation 330-A8 obtain the int_frac_digits by extracting the examples contained in the fields "Monetary_ISO4217_Positive_Format" and "Monetary_ISO4217_Negative_Format". Then parse the extracted strings for both formats to determine the number of decimal digits for each case and compare against one another. If they are the same, continue; otherwise, raise a flag and stop.

Next during operation 330-A9 obtain the frac_digits by extracting the value contained in the field Monetary_NAT_Digits_AfterDecimal". Next extract the examples contained in the fields "Monetary_NAT_Positive_Format" and "Monetary_NAT_Negative_Format" for both positive and negative format. Then parse the extracted strings in both formats to determine the number of decimal places. This value should be the same for both formats. If they are not, raise a flag and stop. Then compare the results from the examples with the value obtained in the first operation. If they are the same, continue; otherwise, raise a flag and stop.

Next during operation 330-A10 obtain the p_cs_precedes by extracting the value contained in the Monetary_NAT_Positive_Format" field for the positive format. Then parse the extracted string to determine the location of the currency symbol. If the symbol appears before the positive formatted monetary quantity, p_cs_precedes is set to 1; otherwise, it is set to 0.

Next during operation 330-A11 obtain the p_sep_by_space by extracting the value contained in the "Monetary_NAT_Positive_Format" field for the positive format. Then parse the extracted string to determine if there is any space separating the currency symbol from the positive formatted monetary quantity. P_sep_by_space is set to 0 if no space exists, otherwise set to 1 if a space separates the symbol from the value, and set to 2 if a space separates the symbol and the sign string, if adjacent.

Next during operation 330-A12 obtain the n_cs_precedes by extracting the value contained in the "Monetary_NAT_Negative_Format" field for the negative format. Then parse the extracted string to determine the location of the currency symbol. If the symbol appears before the negative formatted monetary quantity, n_cs_precedes is set to 1; otherwise, it is set to 0.

Next during operation 330-A13 obtain the n_sep_by_space by extracting the value contained in the "Monetary_NAT_Negative_Format" field for the negative format. Then parse the extracted string to determine if there is any space separating the currency symbol from the negative formatted monetary quantity. N_sep_by_space is set to 0 if no space exists, set to 1 if a space separates the symbol from the value, and set to 2 if a space separates the symbol and the sign string, if adjacent.

Next during operation 330-A14 obtain the p_sign_posn by extracting the value contained in the "Monetary_NAT_Positive_Format" field for the positive format. Then parse the extracted value to determine the positioning of the positive sign for the nonnegative formatted monetary quantity. P_sign_posn is set to 0 if parentheses enclose the quantity and the currency symbol, set to 1 if the sign string precedes the quantity and the currency symbol, set to 2 if the sign string succeeds the quantity and the currency symbol, set to 3 if the sign string immediately precedes the currency symbol, and set to 4 if the sign string immediately succeeds the currency symbol.

Next during operation 330-A15 obtain the n_sign_posn by extracting the value contained in the "Monetary_NAT_Negative_Format" field for the negative format. Then parse the value to determine the positioning of the negative sign for the negative formatted monetary quantity. N_sign_posn is set to 0 if parentheses enclose the quantity and the currency symbol, set to 1 if the sign string precedes the quantity and the currency symbol, set to 2 if the sign string succeeds the quantity and the currency symbol, set to 3 if the sign string immediately precedes the currency symbol, and set to 4 if the sign string immediately succeeds the currency symbol.

The collection of localization values for the monetary category is complete.

Another category to be created in the locale source file is the LC_NUMERIC category shown as follows:

```
#############
LC_NUMERIC
#############
##################################################################
pt _PT example of a positive numeric value: 1.234.567,89 ##
pt _PT example of a negative numeric value: −1.234.567,89 ##
##################################################################
decimal_point "<comma>"
thousands_sep "<period>"
grouping 3
END LC_NUMERIC
```

As with the LC_Monetary category, this category begins with a statement announcing the data contained within LC_Numeric and ends with a corresponding end statement. The field names mentioned below are typically contained in the numeric information category.

Next during operation 330-B1 obtain the decimal_point by extracting the value contained in the "Numeric_Decimal_Separator" field. Then extract the examples contained in the fields "Numeric_Positive_Format" and "Numeric_Negative_Format" for both formats. Next parse the extracted strings of the examples to determine the decimal separator for each format. In each case, they should be the same. If they are not, raise a flag and stop. Then compare the decimal separator obtained in previous operation with the decimal separator from the first operation. If they are the same, continue; otherwise, raise a flag and stop.

Next during operation 330-B2 obtain the thousands_sep by extracting the value contained in the "Numeric_Thousands_Separator" field. Next extract the examples contained in the fields "Numeric_Positive_Format" and "Numeric_Negative_Format" for both positive and negative format. Next parse the extracted values for both formats to determine the thousand separator is in each case. Then compare thousands separator from the example with the extracted thousands separator obtained in the first operation. If they are the same, continue; otherwise, raise a flag and stop.

Next during operation 330-B2 obtain the Grouping, by extracting the value in the "Numeric_Grouping" field. Then extract the examples contained in the fields "Numeric_Positive_Format" and "Numeric_Negative_Format" for both positive and negative format. Then parse the extracted values for both formats to determine the grouping. In either case, it should be the same as the one obtained in the first operation. If they are not the same, raise a flag and stop.

This completes the processing need to create the category LC_NUMERIC in the locale source file output.

Another locale category deals with time and date settings and is known as LC_TIME. As with the previous categories the LC_Time category also begins and ends with proper statements as shown.

```
#############
LC_TIME
#############
###############################################################
Order of abbreviated days: <Sun> <Mon> <Tue> <Wed> <Thu> <Fri> <Sat> ##
###############################################################
abday      "<M><i><n><g><g><u>";\
           "<S><e><n><i><n>";\
           "<S><e><l><a><s><a>";\
           "<R><a><b><u>";\
           "<K><a><m><i><s>";\
           "<J><u><m><a><t>";\
           "<S><a><b><t><u>"
###############################################################
Order of days: <Sunday> <Monday> <Tuesday> <Wednesday> <Thursday> ##
<Friday> <Saturday>                                    ##
###############################################################
day        "<M><i><n><g><g><u>";\
           "<S><e><n><i><n>";\
           "<S><e><l><a><s><a>";\
           "<R><a><b><u>";\
           "<K><a><m><i><s>";\
           "<J><u><m><a><t>";\
           "<S><a><b><t><u>"
###############################################################
Order of abbreviated months: <Jan> <Feb> <Mar> <Apr> <May> <Jun> ##
<Jul> <Aug> <Sep> <Oct> <Nov> <Dec>                    ##
###############################################################
abmon      "<J><a><n><u><a><r><i>";\
           "<F><e><b><r><u><a><r><i>";\
           "<M><a><r><e><t>";\
           "<A><p><r><i><l>";\
           "<M><e><i>";\
           "<J><u><n><i>";\
           "<J><u><l><i>";\
           "<A><g><u><s><t><u><s>";\
           "<S><e><p><t><e><m><b><e><r>";\
           "<O><k><t><o><b><e><r>";\
           "<N><o><v><e><m><b><e><r>";\
           "<D><e><s><e><m><b><e><r>"
###############################################################
Order of months: <January> <February> <March> <April> <May> <June> ##
<July> <August> <September> <October> <November>       ##
<December>                                             ##
###############################################################
mon        "<J><a><n><u><a><r><i>";\
           "<F><e><b><r><u><a><r><i>";\
           "<M><a><r><e><t>";\
           "<A><p><r><i><l>";\
           "<M><e><i>";\
           "<J><u><n><i>";\
           "<J><u><l><i>";\
           "<A><g><u><s><t><u><s>";\
           "<S><e><p><t><e><m><b><e><r>";\
           "<O><k><t><o><b><e><r>";\
           "<N><o><v><e><m><b><e><r>";\
           "<D><e><s><e><m><b><e><r>"
###############################################################
id_ID example of below format is: Monday, 23 Jun 14:59:33, 1997    ##
###############################################################
d_t_fmt "%A %e %b %H<colon>%M<colon>%S %Y"
#######################################################
id_ID example of below date format is: 10/04/98 ##
#######################################################
d_fmt "%d<slash>%m<slash>%y"
#######################################################
id_ID example of below time format is: 14:59:33    ##
#######################################################
```

```
t_fmt "%H<colon>%M<colon>%S"
am_pm "";""
##########################################################
id_ID example of below time format is: 14:59:33    ##
##########################################################
t_fmt_ampm "%H<colon>%M<colon>%S"
##########################################################
id_ID example of below date format is: 24 Jun 1997 ##
##########################################################
nldate "%d %b %Y"
END LC_TIME
```

The field names discussed next are typically contained in the date or calendar information section unless otherwise stated.

Next during operation 330-C1 obtain the abbreviated days of the week, abday by extracting the abbreviated weekday names in Native language from the fields "NTV_Abbreviated_???" where the "???" represents the abbreviated weekday names in English such as Mon thru Sun. If the abbreviated weekday names are not displayable, extract their UCS-2 equivalent from the fields "U_NTV_Abrreviated_???" where the "???" represents the same values as in the previous operation. If the names are displayable replace any non-alphanumeric character with its UCS-2 value and add a pair of angle brackets to each letter in the abbreviated weekday name. If UCS-2 values are extracted, leave the abbreviated weekday names untouched. Put double quotes around each of the abbreviated weekday names.

Next during operation 330-C2 obtain the weekdays, day by extracting the full weekday names in Native language from the fields "NTV_???????" where the "???????" represents the full weekday names in English such as Monday through Sunday. If the names are not displayable, extract their UCS-2 equivalent from the fields "U_NTV_???????" where "?????????" represents the full weekday names as in the previous operation. If the names are displayable replace any non-alphanumeric character with its UCS-2 value and add a pair of angle brackets to each letter in the weekday name. If UCS-2 values are extracted, leave the full weekday names untouched. Place double quotes around each of the full weekday names.

Next during operation 330-C3 obtain the abbreviated month names, abmon by extracting the abbreviated month names in Native language from the fields "NTV_Abbreviated_???" where the "???" represents the abbreviated month names in English such as January, February, and others. If the abbreviated month names are not displayable, extract their UCS-2 equivalent from the fields "U_NTV_Abbreviated_???" where the "???" represents the same value as in the previous operation. If the names are displayable, replace any non-alphanumeric character with its equivalent UCS-2 value and add a pair of angle brackets to each letter in the abbreviated month names. If the UCS-2 values are extracted, leave the abbreviated month names untouched. Put double quotes around each abbreviated month name.

Next during operation 330-C4 obtain the full month name mon by extracting the full month names in Native language from the fields "NTV_???????" where the "???????" represents the full month names in English such as January through December. If the full month names are not displayable, extract their UCS-2 equivalent from the fields "U_NTV_????????" where the "?????????" represents the same value as in the previous operation. If the names are displayable and are extracted properly, replace any non-alphanumeric character with its UCS-2 value and add a pair of angle brackets to each letter in the month name. If UCS-2 values are extracted, leave the full month names untouched. Put double quotes around each full month names.

All field names discussed next are typically contained in the date and time Information section unless otherwise stated.

Next during operation 330-C5 obtain the date format d_t_fmt by extracting the value from the "Date_NTV_Full_Format" field. Then parse the extracted value to determine the day and month name. Next extract the full weekday name for Tuesday in native language from the field "NTV_Tuesday" in the Calendar section. Extract the full month name for April in native language from the field "NTV_April" in the Calendar section. Compare the parsed weekday name with the extracted value Tuesday from the previous operation. If the comparison is equal then, continue; otherwise, raise a flag and stop. Next compare the parsed month name with the extracted month value in the previous operation. If they are the same, then continue; otherwise, raise a flag and stop. Next parse the extracted string in from the first operation to determine the positioning of the day, date, month and year in the date format. Then create a string with day replaced by %A, date replaced by %d, month replaced by %B and year replaced by %Y in the order that they appear in the Full Date Format. Finally repeat similar steps for the Time format and append the resulting string to the one from the previous operation.

Next during operation 330-C6 obtain a common date format, d_fmt by extracting the value from the Date_NTV_Common_Format" field. Parse the extracted string from the previous operation to determine the date separator and compare it with the value specified in the "Date_Short_Separator" field. If they are the same, continue; otherwise, raise a flag and stop. Next parse the extracted string from the first operation to determine the positioning of the date, month and year. Create a string with date replaced by %d, month replace by %m and year replaced by %Y in the order that they appear in the Common Date Format.

Next during operation 330-C7 obtain the full time format t_fmt by extracting the value from the "Time_NTV_Full_Format" field. Extract the value from the "Time_Separator" field. Parse the extracted string in the first operation to determine the time separator and compare it with the time separator second operation. If they are the same, continue; otherwise, raise a flag and stop. Next extract the value from the "Time_24 hr_Clock_Used" field. If the value is No, parse the string from the first operation to determine the value for the afternoon string and compare it with the afternoon string specified in the "Time_NTV_Afternoon_String". If they are the same, continue; otherwise, raise a flag and stop. Next parse the string from the first operation to determine the location of the hour, minute and second. Create a string with hour replaced by %H, minute replaced by %M and second replaced by %S in the order that they appear in the Full Time Format. This then becomes the value for the t_fmt keyword.

Next during operation 330-C8 obtain the am-pm indicator, am_pm by extracting the value from the "Time_24 hr_Clock_Used" field. If value is Yes, am_pm is set to an empty string (i.e. " ") If value is No, extract "Morning string in native language" and "Afternoon string in native Language". Compare the afternoon string with the one used in the Full Time Format. If they are the same, continue; otherwise, raise a flag and stop.

Next during operation 330-C9 obtain t_fmt_ampm by extracting the value from the 'Time_24 hr_Clock_Used" field. If value is Yes, t_fmt_ampm is set to null (i.e. empty string) If value is No, extract the value from the "Time_NTV_Common_Format" field. Parse the string to determine what the "Time Separator" is and compare it with the value specified in the "Time Separator" field. If they are the same, continue; otherwise, raise a flag and stop. Next parse the extracted string in third operation to determine the positioning of the hour, minute and second. Next create a string with hour replaced by % I, minute replaced by % M and second replaced by % S in the order that they appear in the Common Time Format. Parse the Common Time Format string to determine the positioning of the afternoon string. Either prefix or append % p to the string in the previous operation depending on the order the afternoon string appears.

This completes processing of localization values for the data and time category of the locale source file.

When dealing with yes and no responses, yet another category of the locale source file, LC_MESSAGES is used.

```
#############
LC_MESSAGES
#############
yesexpr "^([<y><Y>]\[<y><Y>][<a><A>])"
noexpr "^([<t><T>]\[<t><T>][<i><I>][<d><D>][<a><A>][<k><K>])"
END LC_MESSAGES
```

Next during operation 330-D1 obtain the yes expression yesexpr by extracting the values contained in the "Affirmative_Response_Short" field. Put angle bracket around the upper and lower case of each letter that appears in the short responses and enclose it within square brackets. For example, the affirmative short response for the above example is y. Both the upper and lower case Y is enclosed in angle brackets, which is further enclosed in square brackets. Next extract the values contained in the "Affirmative Response" field Repeat the second operation for the string value. Then append the resultant string in the previous operation to the string from the first operation with a vertical bar separating the two. Next enclose the whole string in round brackets. Prefix a ^ (i.e. Circumflex accent) in front of the string and put quotes around it.

Next during operation 330-D2 obtain the related no expression, noexpr by extracting the values contained in the "Negative_Responses_Short" field. Put angle bracket around the upper and lower case of each letter that appears in the short responses and enclose it in square brackets. For example, the negative short response for the above example is t. Both the upper and lower case t is enclosed in angle brackets, which is further enclosed in square brackets. Then extract the values contained in the "Negative_Response" field Repeat the second operation for the extracted value. Append the resultant string from the previous operation to the string in step 1 with a vertical bar separating the two strings. Enclose the whole string in round brackets. Finally prefix a ^ (i.e. Circumflex accent) in front of the string and put quotes around it.

This completes processing of the yes/no expressions for the LC_MESSAGES category of the locale source file. Processing would move to operation 360 during which assembly would take place to collect the category definitions created in previous stages of the just described process. As mentioned earlier the local source file would be composed of output as just described plus files containing LC_CTYPE and LC_COLLATE. A simple text editor as found on systems may be used to perform the necessary addition of the two files to the just produced locale category entries.

Although the invention has been described with reference to illustrative embodiments, it is to be understood that the invention is not limited to these precise embodiments, and that various changes and modifications may be effected therein by one skilled in the art. All such changes and modifications are intended to be encompassed in the appended claims.

What is claimed is:

1. A method for creating a specific locale source file on demand suitable for compilation in a computer, the method comprising:

receiving a request to assemble a specific locale source file;

retrieving an input file including a plurality of localization values related to the specific locale source file;

determining a first category of localization values;

selecting process routines based on the first category of localization values, wherein each process routine comprises a scripting function to automatically extract localization values associated with the first category of localization values;

selectively extracting first localization values associated with the first category of localization values via the selected process routines;

storing the extracted first localization values into a memory of the computer;

determining a positive monetary format and a negative monetary format for inclusion in the specific locale source file when the first category is a monetary category;

replacing a currency symbol with a corresponding alphabetic name when the currency symbol of the specific locale source file is in a graphical form; and assembling the extracted first localization values into the specific locale source file suitable for compilation.

2. The method of claim 1, wherein the plurality of localization values is sufficient to populate at least one category of the specific locale source file.

3. The method of claim 1, wherein selectively extracting further comprises comparing at least one of the localization values against a reference value, wherein extracting is performed upon a successful comparison.

4. The method of claim 3, wherein assembling the extracted information further comprises adding one file selected from a group consisting of an LC_CTYPE file, an LC_COLLATE file, and both LC_TYPE and LC_COLLATE files into the specific locale source file.

5. The method of claim 4, wherein the request is initiated by at least one of a manual means involving a user and a programmatic means.

6. The method of claim 1, wherein the plurality of localization values of the input file are formatted according to a first format, and wherein the specific locale source file includes the extracted first localization values formatted according to a second format.

7. The method of claim 6, wherein the computer includes a UNIX operating system and the second format is adapted for compilation by the computer.

8. The method of claim 6, further comprising automatically filtering the plurality of localization values to provide a set of localization values associated with the specific locale of the specific locale source file.

9. The method of claim 1, wherein the specific locale source file includes a plurality of elements and wherein each of the plurality of elements is associated with one or more of the plurality of localization values.

10. The method of claim 9, wherein each of the plurality of elements of the specific locale source file includes a name-value pair and wherein the one or more of the plurality of localization values of a respective element is associated with a field of the input file, the field of the input file having the same name as the name-value pair of the respective element.

11. The method of claim 1, wherein the request has been initiated by at least one of a manual means involving a user, and a programmatic means.

12. The method of claim 1, wherein selectively extracting further comprises comparing at least one localization value against a reference value.

13. A non-transitory computer readable storage medium embodying computer readable instructions, comprising:
   instructions executable by a computer to receive a request to assemble a specific locale source file;
   instructions executable by the computer to retrieve an input file including a plurality of localization values related to the specific locale source file;
   instructions executable by the computer to determine a first category of localization values and to select process routines based on the first category of localization values, wherein each process routine comprises a scripting function to automatically extract localization values pertaining to associated with the first category of localization values;
   instructions executable by the computer to selectively extract localization values associated with the first category by scripting functions of the selected process routines;
   instructions executable by the computer to store the extracted localization values into a memory of the computer; and
   instructions executable by the computer to determine a positive monetary format and a negative monetary format for inclusion in the specific locale source file when the first category is a monetary category;
   instructions executable by the computer to replacing a currency symbol with a corresponding alphabetic name when the currency symbol of the specific locale source file is in a graphical form; and
   instructions executable by the computer to assemble the extracted localization values into the specific locale source file suitable for compilation.

14. The non-transitory computer readable storage medium of claim 13, further comprising instructions executable by the computer to compare at least one of the localization values against a reference value, wherein the extraction is performed upon a successful comparison.

15. The non-transitory computer readable storage medium of claim 13, wherein the plurality of localization values of the input file are formatted according to a first format, and wherein the specific locale source file includes the extracted localization values formatted according to a second format.

16. The non-transitory computer readable storage medium of claim 13, further comprising instructions executable by the computer to automatically filter the plurality of localization values to provide a set of localization values associated with a specific locale of the specific locale source file.

* * * * *